United States Patent
McQueeney et al.

(10) Patent No.: US 7,873,537 B2
(45) Date of Patent: Jan. 18, 2011

(54) PROVIDING DEEP LINKING FUNCTIONS WITH DIGITAL RIGHTS MANAGEMENT

(75) Inventors: David McQueeney, Goldens Bridge, NY (US); Edward E. Kelley, Wappingers Falls, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 2004 days.

(21) Appl. No.: 10/707,301

(22) Filed: Dec. 4, 2003

(65) Prior Publication Data
US 2005/0125285 A1 Jun. 9, 2005

(51) Int. Cl.
*G06Q 30/00* (2006.01)
(52) U.S. Cl. .................... 705/14.49; 705/310
(58) Field of Classification Search .............. 705/14.49, 705/310
See application file for complete search history.

(56) References Cited

U.S. PATENT DOCUMENTS

| | | | | |
|---|---|---|---|---|
| 6,177,936 B1 * | 1/2001 | Cragun | ...................... | 715/760 |
| 6,539,424 B1 | 3/2003 | Dutta | ......................... | 709/219 |
| 6,826,594 B1 * | 11/2004 | Pettersen | ..................... | 709/203 |
| 2002/0065877 A1 | 5/2002 | Kowtko et al. | | |
| 2005/0119921 A1 * | 6/2005 | Fitzgerald et al. | .............. | 705/5 |

OTHER PUBLICATIONS

Patent Cooperation Treaty International Search Report dated Apr. 12, 2005 for International Application No. PCT/US04/40567; 5 pages.

* cited by examiner

*Primary Examiner*—John G. Weiss
*Assistant Examiner*—Matthew L Hamilton
(74) *Attorney, Agent, or Firm*—Cantor Colburn LLP; Ronald Kaschak

(57) ABSTRACT

A method for providing deep linking activities with digital rights management. In an exemplary embodiment, the method includes identifying a hypertext link on a source web page as a deep link and, upon selecting the deep link, accessing a deep link table associated with the deep link. The hypertext link refers to a target web page on a target web site. The deep link table contains web page links and rules operable for establishing web content that is to be presented to a visitor of the target web site. The method also includes displaying web content to the visitor in accordance with the rules. The invention also includes a system and a storage medium.

48 Claims, 16 Drawing Sheets

PROVIDING DEEP LINKING FUNCTIONS WITH DIGITAL RIGHTS MANAGEMENT

BACKGROUND OF INVENTION

The present invention relates generally to web-based services and, more particularly, to a method, system, and storage medium for providing deep linking functions with digital rights management.

A deep link refers to a hyperlink located on a web page or search engine query that, when selected by a user, transfers the user to another web page of a web site that is different than the web site's home page or "first page". As evidenced in recent litigation, there has been much controversy over the legal and ethical implications associated with deep linking activities in terms of the digital rights of web site owners and content authors. Some businesses and advertisers object to the proliferation of deep links because they can result in a web site visitor bypassing pages that incorporate paid advertising. Also of concern is the potential for copyright infringement where a deep link causes a visitor to bypass important copyright information that would otherwise inform the public of the identity and ownership rights of the author and may interfere with an author's right to display or communicate his/her work to the public where the visitors are diverted away from the author's web site and toward the offending web site.

A related issue is the practice of using browser software to "frame" content from another online source. Legal difficulties may arise because a visitor sees the original web site content, which may be copyright protected, framed by a different web site with a different Uniform Resource Locator, and possibly with different logos and advertising. This practice may constitute copyright infringement because copies created in the process of framing may constitute a reproduction of the work that is subject to property rights by the author.

Accordingly, it would be desirable to be able to provide a means for web site owners to comply with a target web site's requirements to display specified web pages and/or web page elements that would otherwise be avoided through the process of deep linking activities. It is also desirable to provide a means for target web site owners and/or authors to communicate their desired display of web pages to other web site owners and authors who wish to link their site to the target site.

SUMMARY OF INVENTION

The foregoing discussed drawbacks and deficiencies of the prior art are overcome or alleviated by a method for providing deep linking activities with digital rights management. In an exemplary embodiment, the method includes identifying a hypertext link on a source web page as a deep link and, upon selecting the deep link, accessing a deep link table associated with the deep link. The hypertext link refers to a target web page on a target web site. The deep link table contains web page links and rules operable for establishing web content that is to be presented to a visitor of the target web site. The method also includes displaying web content to the visitor in accordance with the rules. The invention also includes a system and a storage medium.

BRIEF DESCRIPTION OF DRAWINGS

Referring to the exemplary drawings wherein like elements are numbered alike in the several FIGURES.

DETAILED DESCRIPTION

Figure 1:
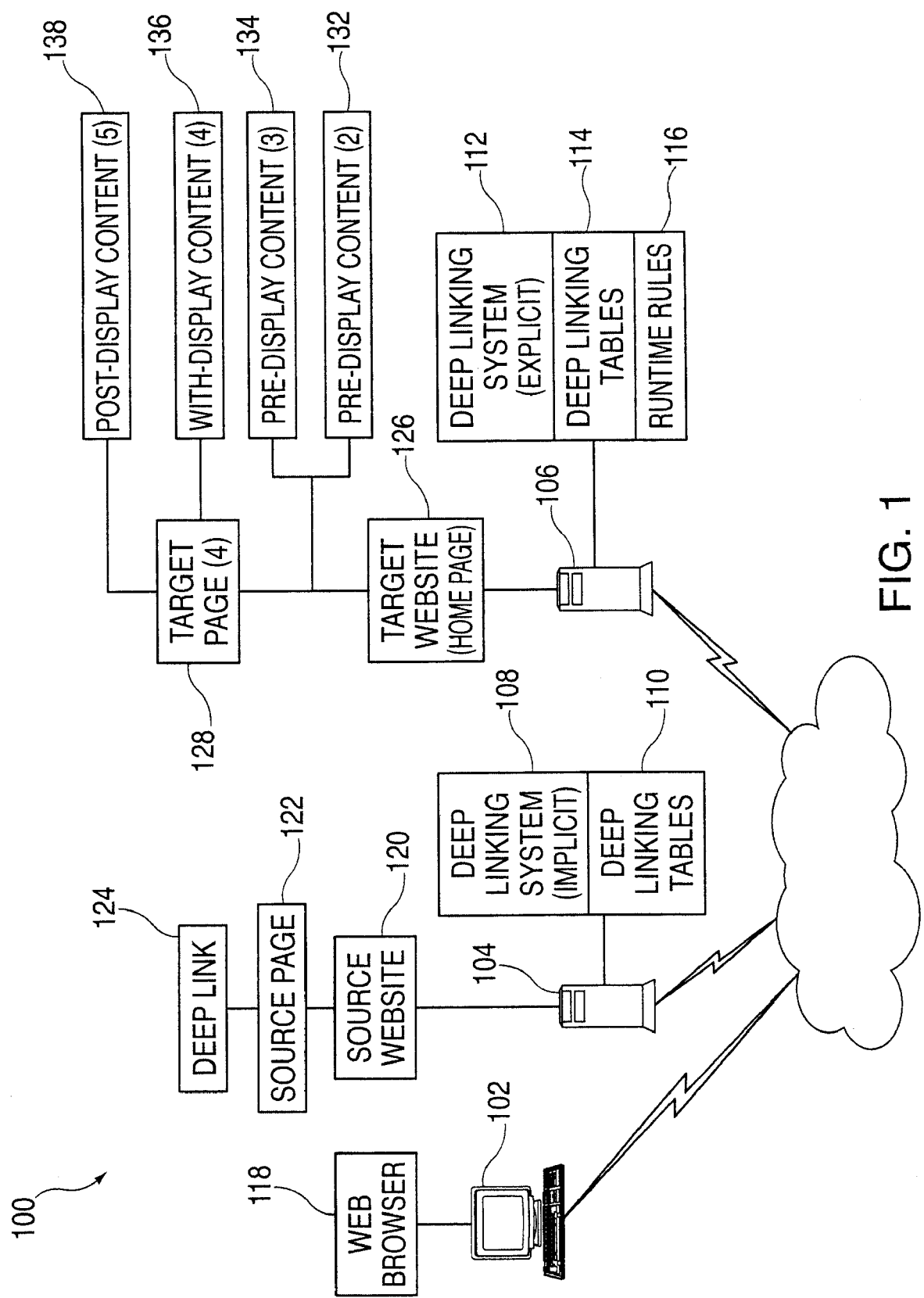
FIG. 1 is a block diagram of a system upon which the deep link system is implemented in accordance with an exemplary embodiment of the invention.

Disclosed herein is a method, system, and storage medium for providing deep linking functions with digital rights management. The deep link system provides a means to display web pages and elements of web pages that are otherwise avoided when deep linking occurs. The deep link system builds a path (e.g., a deep link table) to the deep link of the target page. The user traverses each screen in accordance with the links provided in the deep link table in an order specified by the target web site.

The following terms and definitions are provided for reference.

Source web site. A source web site as used herein refers to a web site that includes one or more hypertext links to another web site (e.g., target web site). The second web site is typically authored/owned by an individual or entity that is different than the author of the source web site.

Source page. A source page refers to a web page located on a source web site.

Target web site. A target web site is a web site that is referred to by a source web site via one or more hypertext links.

Target page. A target page refers to a web page located on a target web site.

Direct Access. Direct access occurs when a source web site author includes a link to content on a target web site without considering the possible implications of copyrights held by the target site owner. The web browser, encountering the link, immediately displays the information referred by the link.

Deep Access. A source web site author includes a link to content on a target web site, considering the implications of digital rights management for the owner of the target web site.

Implicit deep link access. A source web site author includes a link to a target web site, considering the path by which the pages on the target web site would be reached by a typical visitor, and replicates those actions in the reference to the target web site. The source web site author's intent is to make sure that any side effects of viewing the target web pages of interest are repeated when including the hypertext link to the target web site's page.

Implicit deep linking occurs when several pages are intended to be viewed before a page of interest is viewed. The design of a target web site, particularly its connectivity of which page links to which, implicitly expresses the content owner's/author's intentions of what pages should be displayed before, during, and after the display of a page of interest, typically beginning at the target web site's home page. In this instance, source site authors seeking to respect the content owners rights determine how to follow the target site owner's intent by manually or automatically analyzing the target site. Following the analysis, a deep link table is created on the source server, to tell the user's web browser how to use intermediate content to replicate the target web site author's intent.

Explicit deep link access. A target web site author specifies explicitly the intended digital rights management process that is to be used when the content is referred to by source web site authors.

Explicit deep linking occurs where the content author makes specific intentions known to potential source authors who are linking to pages on the target web site, by creating deep link tables for each page or element of a page that is to be deep linked. This makes it convenient for the source page author to comply with the target author's intentions. A web page element refers to a portion of a web page such as an image, a logo, a banner, etc.

Intermediate content. Intermediate content refers to web pages on a target web site that should be shown before, during, and/or after display of a target web page, in order to comply with the digital rights management implications in implicit or explicit access. The web pages shown before the display of the target page are also referred to as "predisplay" content. The web pages shown during the display of the target page are also referred to herein as "with-display" content, and the web pages shown after the display of the target page are also referred to herein as "post-display" content.

Deep link table. A deep link table refers to a table containing the information required on a source web site that is necessary to comply with implicit or explicit deep access. The table may be populated by one or more of the four processes described further herein.

Page of interest. A page of interest refers to a web page containing information desired by a visitor. A page of interest is also referred to herein as "target web page" as described above.

Prior art systems generally allow for direct access to a target web page. When one web page (e.g., a source page) refers to another page (e.g., a target page) by indicating its Uniform Resource Locator (URL) in a hypertext link, a web browser immediately displays the target web page on the visitor's computer screen. Web site authors typically organize their content in such a way that various web pages are to be viewed in a defined order. However, when a source web site author wants to reference information on a target's site, the target site's intent of showing the desired information (in the order desired) may be defeated when the source site makes a direct link to the page of interest. The deep link system of the invention provides a means to display web pages and elements of web pages that are intentionally or unintentionally avoided when deep linking occurs.

Referring initially to FIG. 1, there is shown a block diagram of a network system for implementing the deep link system. Network system 100 includes a computer system 102, a source server 104, and a target server 106 in communication with each other via a network such as the Internet or other suitable networking architecture.

Computer system 102 may be a general purpose desktop computer that subscribes to an Internet service provider and includes operating system software, a web browser 118, and any other suitable programs that reside in memory and execute on computer system 102. The deep link system may be executed on source server 104, target server 106, or a combination of the above.

Server 104 and 106 each comprise a high-powered multi-processor computer device including web server and applications server software for receiving requests from computer system 102 to access web pages over the World Wide Web. The services provided by the deep link system may be provided by an electronic utilities (e-utilities) business that outsources computing resources such as applications, such as the deep link system.

Figure 3:
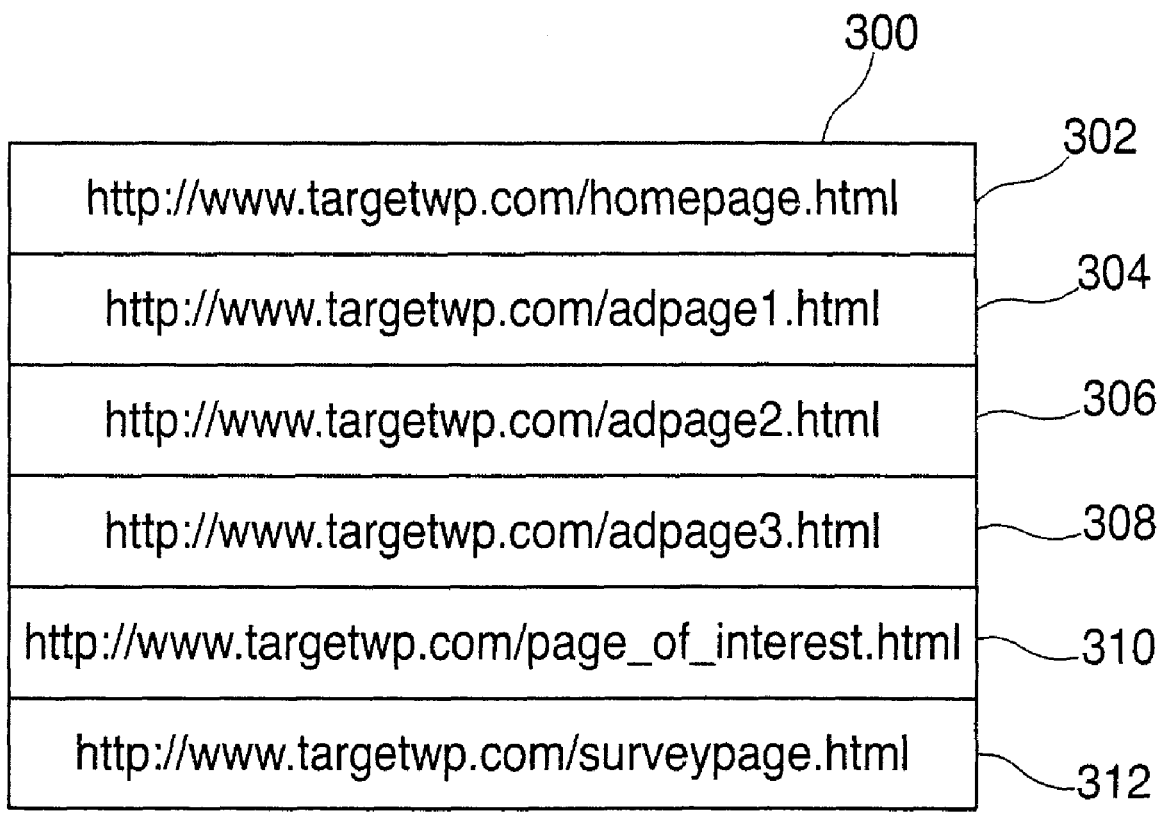
FIG. 3 illustrates a sample deep link table created by the deep link system in accordance with a further aspect of the invention.

A source web site 120 is in communication with source server 104 and represents a web site that includes a web page 122 (also referred to as source web page 122). The source web page 122 includes a deep link 124 to another web site (e.g., target web site 126). The deep link 124 is described further herein. In one embodiment, source server 104 executes the deep link system 108 for performing implicit deep link access and stores deep link tables 110 as described further herein. A sample deep link table is shown in FIG. 3.

System 100 also includes a target server 106 that includes a target web site 126 and target web page 128. Target web page 128 represents a page that is of interest to a visitor of the web site. Intermediate content pages 132-134 represent web pages that the target web site organizes in a manner and with the intention that they be displayed sequentially and prior to the display of the target web page 128. Examples of intermediate content pages 132-134 may include advertising, disclaimer notices, copyright information, licensing terms and conditions, etc. "With-display" content page 136 represents a web page that is intended to be viewed at the same time the target page 128 is viewed. Typical "with-display" content includes advertising and page frames or pop-up frames. Likewise, "post-display" content page 138 represents a web page that is intended to be viewed subsequent to the display of the target web page 128. Examples of post-display information includes advertising, customer satisfaction queries, and web surveys.

In an alternative embodiment, target server 106 executes the deep link system 112 and performs explicit deep link access functions. Target server 106 stores deep link tables 114. Target server 106 also executes run time rules 116 as will be described further herein.

The deep link system may be executed as a stand-alone application that is installed or downloaded on computer system 102 or may be incorporated into an existing web services application, web browser program, or commercially-available product as an enhancement feature. Further, as indicated above, the features of the deep link system may be provided via a third party application service provider (ASP) or e-utilities broker where service is provided for a per-use fee. These and other embodiments are described further in FIGS. 4-11.

Figure 2:
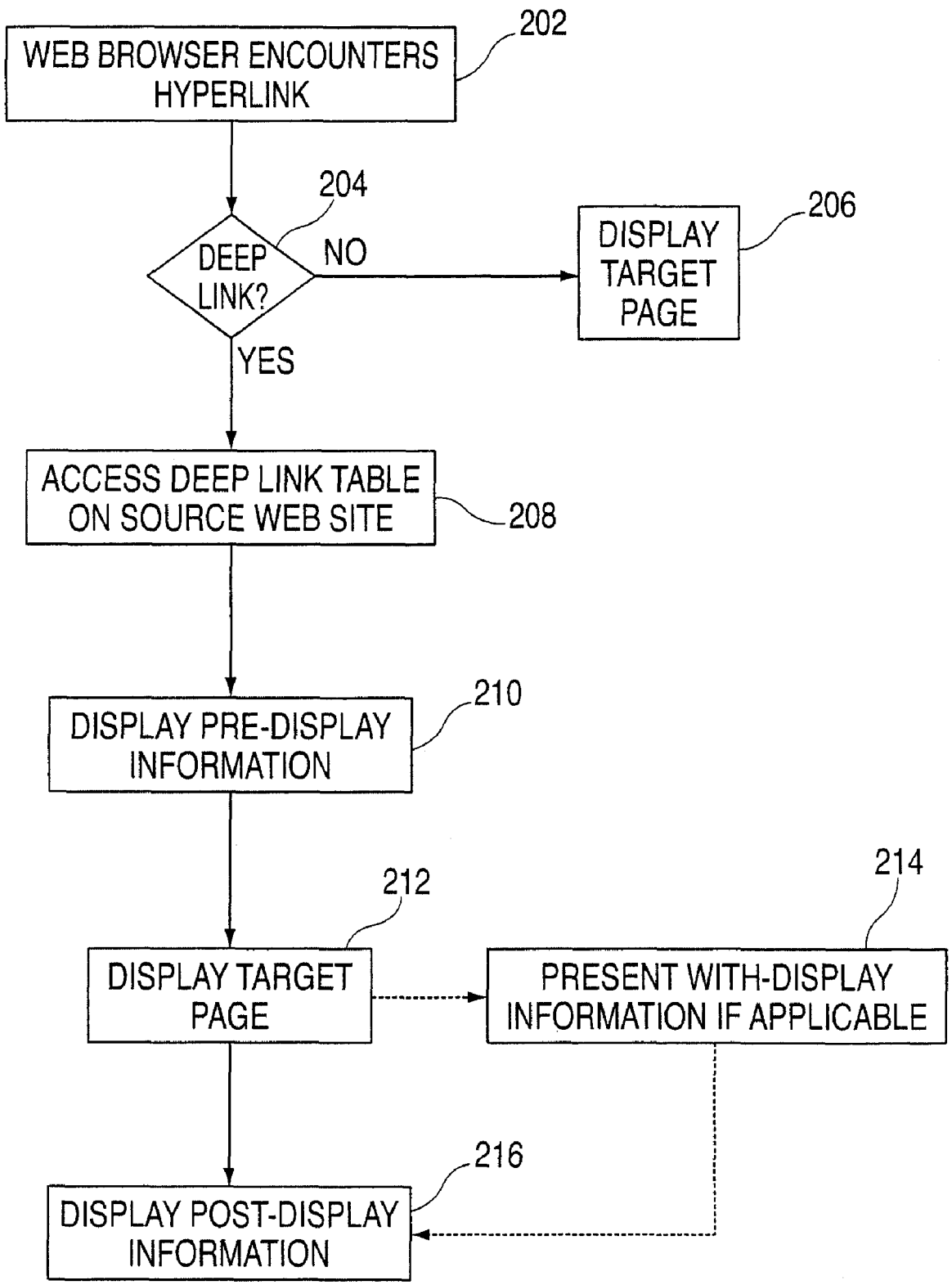
FIG. 2 is a flowchart describing a process of implementing the deep link system in accordance with a further aspect of the invention.

FIG. 2 is a flowchart describing the process of implementing the deep link system in an exemplary embodiment. When a source web site author is concerned about complying with the rights of a target site owner, he/she codes a link as a deep link. Associated with each deep link is a table of actions that are to be followed before, during, or after display of the link. The table may be created by four possible methods-manual or automatic, and may be initiated by the source web site author, or the target web site author. These methods are described in FIGS. 4-7. A sample deep link table is shown in FIG. 3.

A web browser 118 encounters a hyperlink at step 202. It is determined whether the hypertext link is a deep link at step 204. If not, the target web page 128 is displayed at step 206. If the hypertext link is a deep link at step 204, a deep link table 110 on the source web site 120 is accessed at step 208 (see generally FIG. 3). Any pre-display information 304-308 (i.e., intermediate content pages 132-134) is displayed at step 210 in accordance with the links provided in deep link table 110.

Once the pre-display information has been presented, the target page 128 is displayed at step 212 as indicated in table 300 at 310. Simultaneous with the presentment of the target page 128, any required "with-display" information 136 is presented at step 214. Finally, post-display information 138 is presented at step 216 (shown in table 300 at 312).

Figure 4:
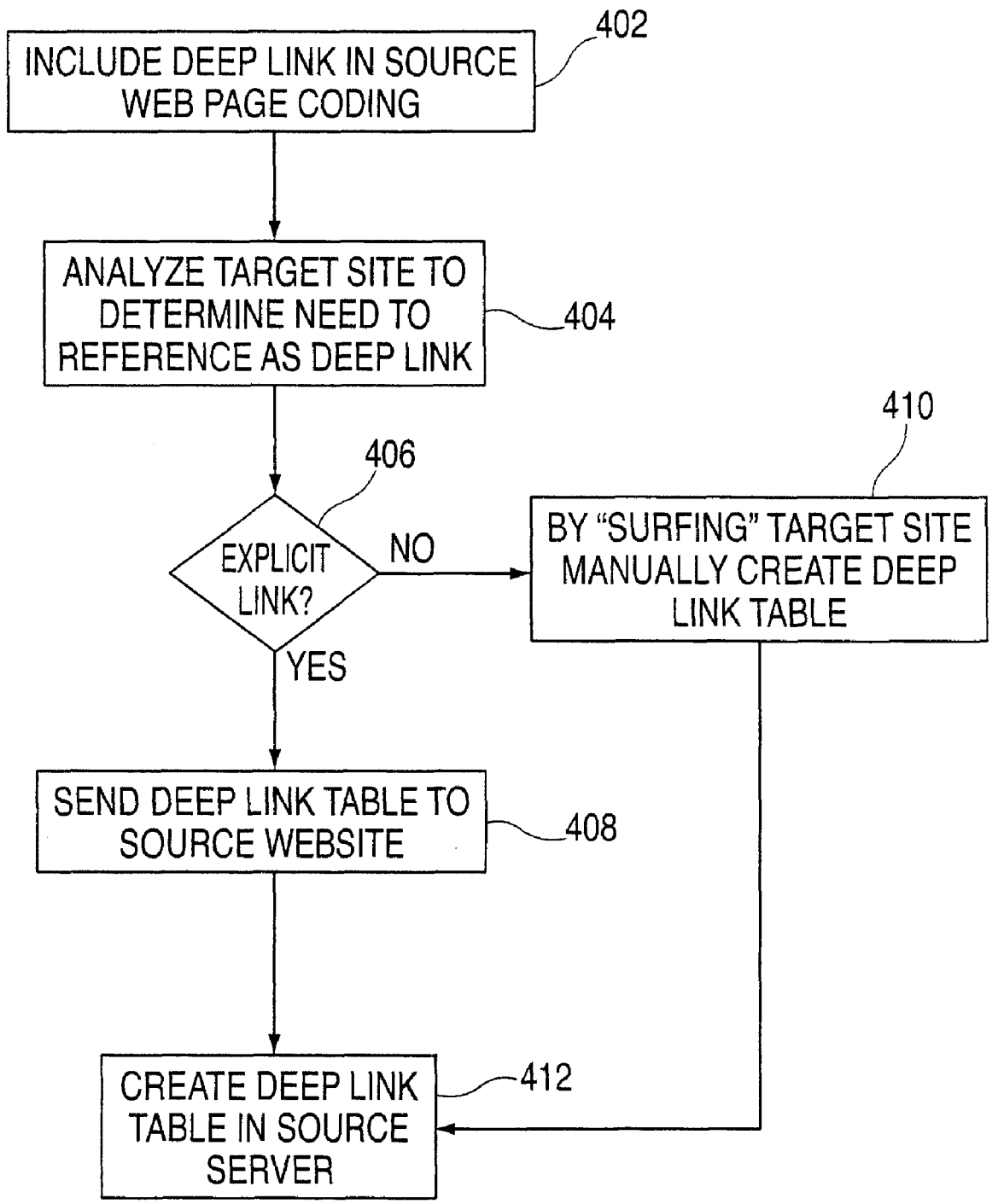
FIG. 4 is a flowchart describing the process of creating a deep link table in accordance with a further aspect of the invention.

FIG. 4 is a flowchart illustrating a manual process for creating a deep link table by a source web site author. A source web site author decides to include a deep link in source web page coding at step 402. The author then creates a deep link table 110 by "surfing" the target site 126, 128, 132-138, and using his/her judgment and reasoning to identify links that should be expressed as deep links at step 404. This is accomplished by starting at the target web site's home page 126 and navigating through the site until the page of interest 128 is encountered, and using that browsing history to fill in the deep link table 110. At step 406, it is determined whether the page of interest 128 has a target deep link table 114 (i.e., explicit deep linking), discoverable by examining the HTML source code of the page accessible by the browser. If this explicit information is encountered, it is moved directly to the source site server 104 to act as a deep link table at step 408. If no explicit information is found, then the source author creates a deep link table 110 as described above at step 410 (i.e., implicit deep linking).

Figure 5:
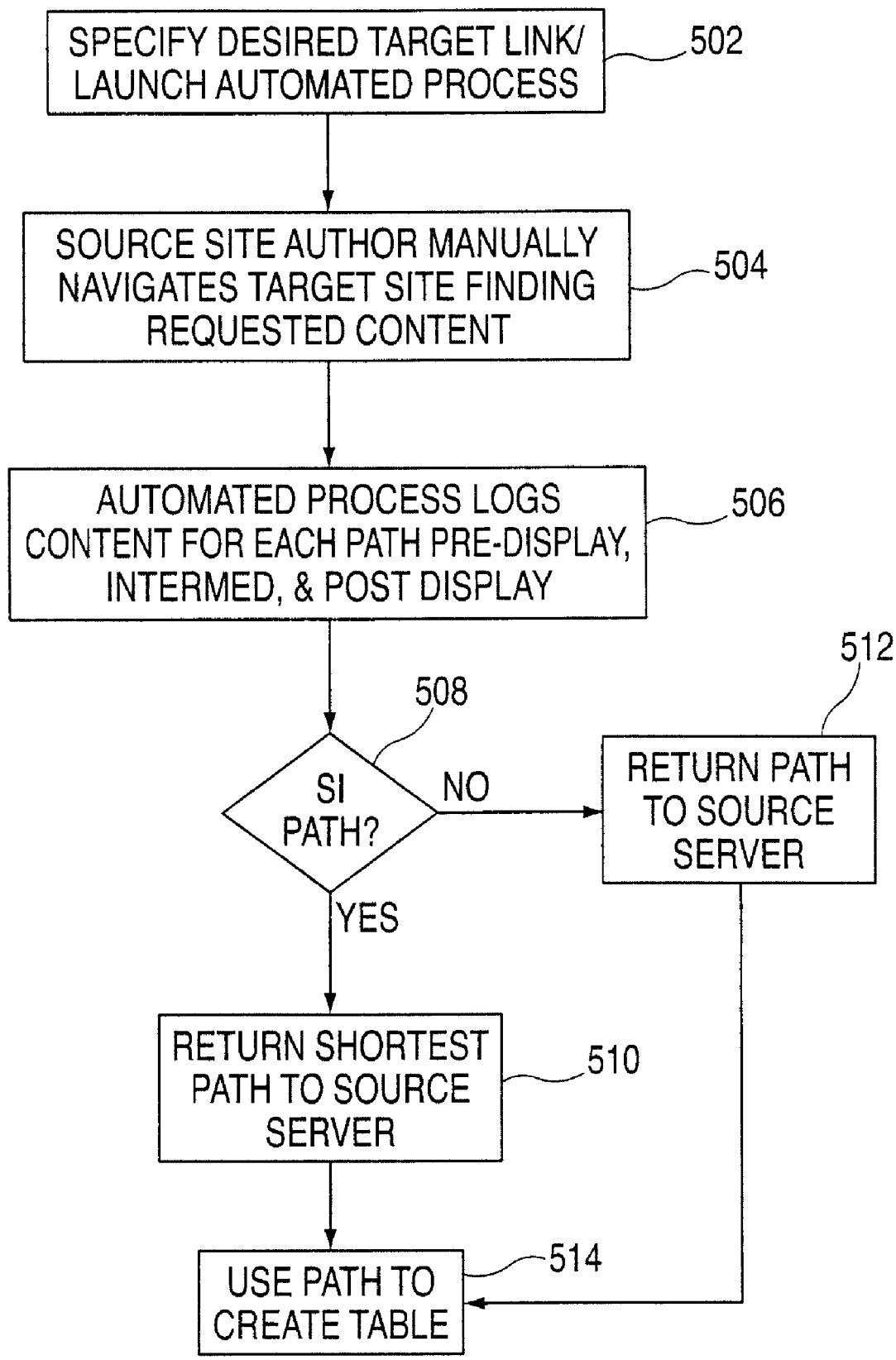
FIG. 5 is a flowchart describing the process of creating a deep link table in accordance with a further aspect of the invention.

In an alternative embodiment, a deep link table 110 may be created by a source web site author using an automatic process as described in FIG. 5. The author specifies a desired target link (i.e., a link to a page of interest on the target server), and launches an automated process at step 502. The source web site author manually navigates the target web site, finding intermediate content 132-138 that the target web site author intends to be viewed before, during, and/or after the target web page 128 at step 504. During manual navigation of one or more routes to the target page 128, the automated process logs all intermediate content 132-138 for each path from the target web site homepage to the target web page at step 506. At step 508, it is determined if multiple paths are discovered to the target web page. If multiple paths are found, the shortest path is returned to the source server 104 at step 510. If only one path is found, the sole path is returned to the source server 104 at step 512. At step 514, the path is used to create a deep link table 110.

Figure 6:
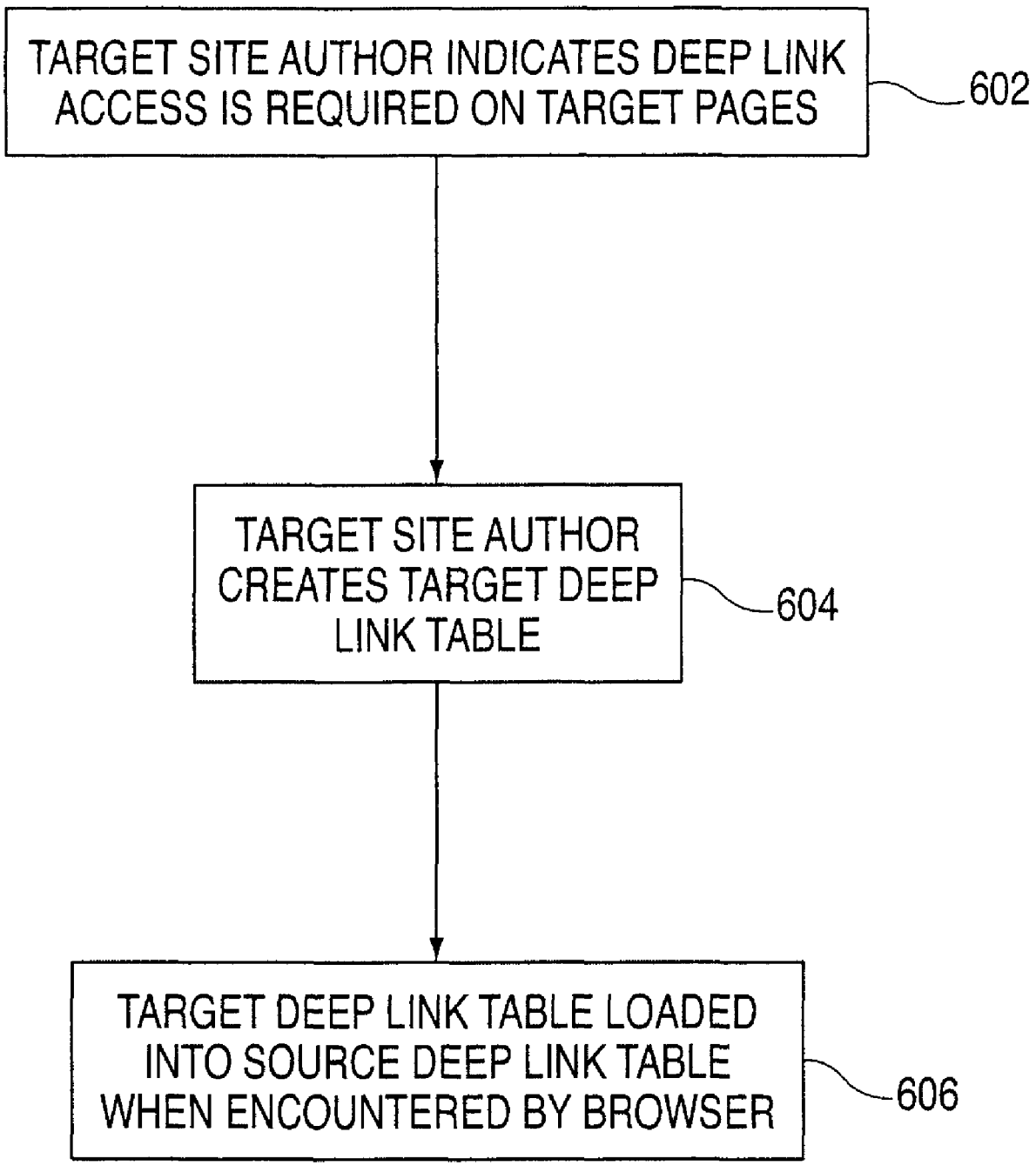
FIG. 6 is a flowchart describing the process of creating a deep link table in accordance with a further aspect of the invention.

In yet a further embodiment, a deep link table may be created by a content owner of the target web site as described in FIG. 6. In step 602, a target web site author indicates on all target web pages requiring digital rights management that desired access is via deep links. The target web site author creates a target deep link table 114 for each deep link on the target web site, listing all required pre-display, intermediate content, and post-display content 132-138 for each deep link at step 604. The target deep link table 114 is loaded into the source web site's deep link table 110 when encountered by a web browser 118 at step 606 and the respective web pages are displayed accordingly. This method allows for the execution of run-time decisions 116 indicating how the rights management is to be applied. Run-time decisions may be based upon the visitor's identification, credentials, browsing history, or other elements. For example, the target site author may make different decisions on required intermediate content, or use other digital rights management techniques, depending on who the visitor is (e.g., an existing customer versus a new customer), and what the visitor is thought to be doing at the site (e.g., browsing versus making a purchase).

Figure 7:
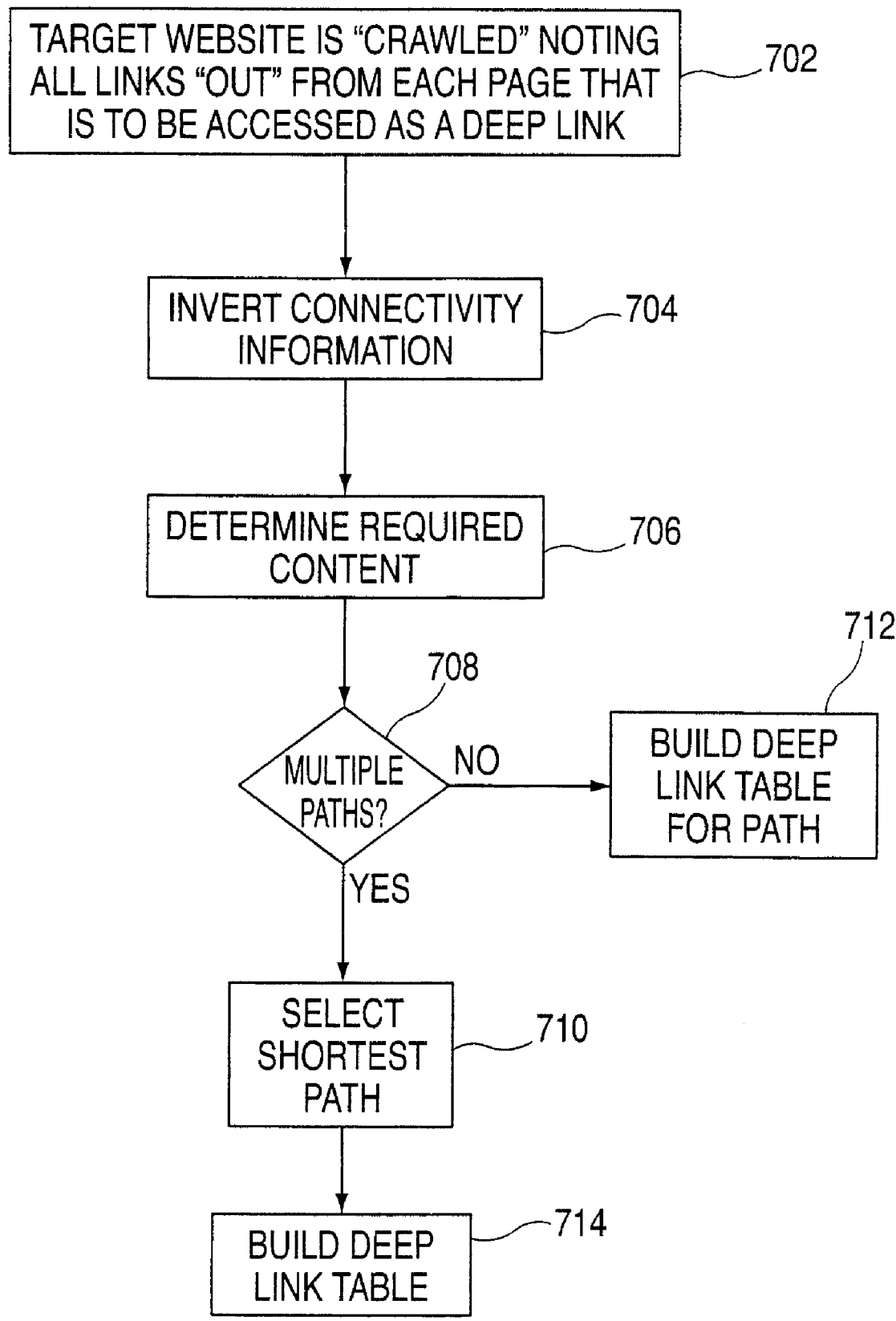
FIG. 7 is a flowchart describing the process of creating a deep link table in accordance with a further aspect of the invention.

In a further embodiment, a deep link table may be automatically generated from a target web site server as described in FIG. 7. At step 702, the target web site is "crawled" noting all links "out" from each page that is to be accessed as a deep link. Connectivity information is inverted to reflect links "in" to each page at step 704. At step 706, it is determined from the connectivity data "in" and "out", what intermediate content is required for each potentially deep linked web page. At step 708 it is determined if the potential deep links have multiple paths from the target home page. If there are multiple paths, the shortest path is selected at step 710. If only one path is noted, a deep link table is built for the path (and for each link identified as "deep") at step 712. Otherwise, a deep link table is built for the shortest path (and for each link identified as "deep") at step 714.

Once the deep link table has been created and is operable, a means for facilitating web page scrolling through a deep link path may be provided. This may be accomplished by various means such as defining placement of an input device such as a mouse on a web page that is used to scroll through deep links. It may also be accomplished by moving the displayed screen in order to position the item selected at the same location throughout the deep link path. Alternatively, scrolling may be enabled by continuously depressing a key that has been defined for this purpose.

The deep link system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of deep link system software. To implement the deep link systems and methods of the present invention, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of same with reference to the flowcharts of FIGS. 8A and 8B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of same should be readily understood.

Figure 8A:
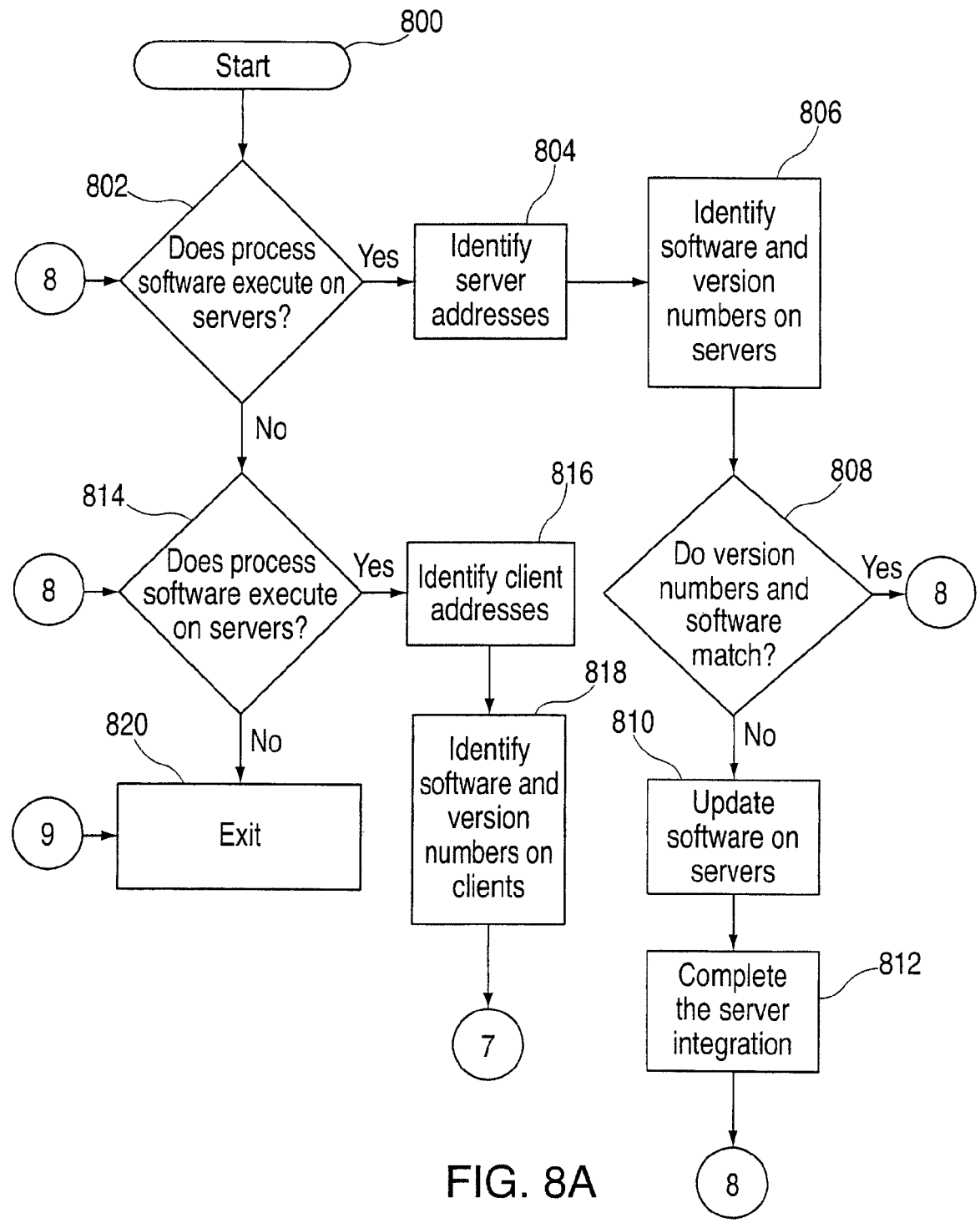
FIGS. 8A and 8B are flowcharts illustrating how process software implementing the systems and methods of the invention may be integrated into client, server, and network environments.
Figure 8B:
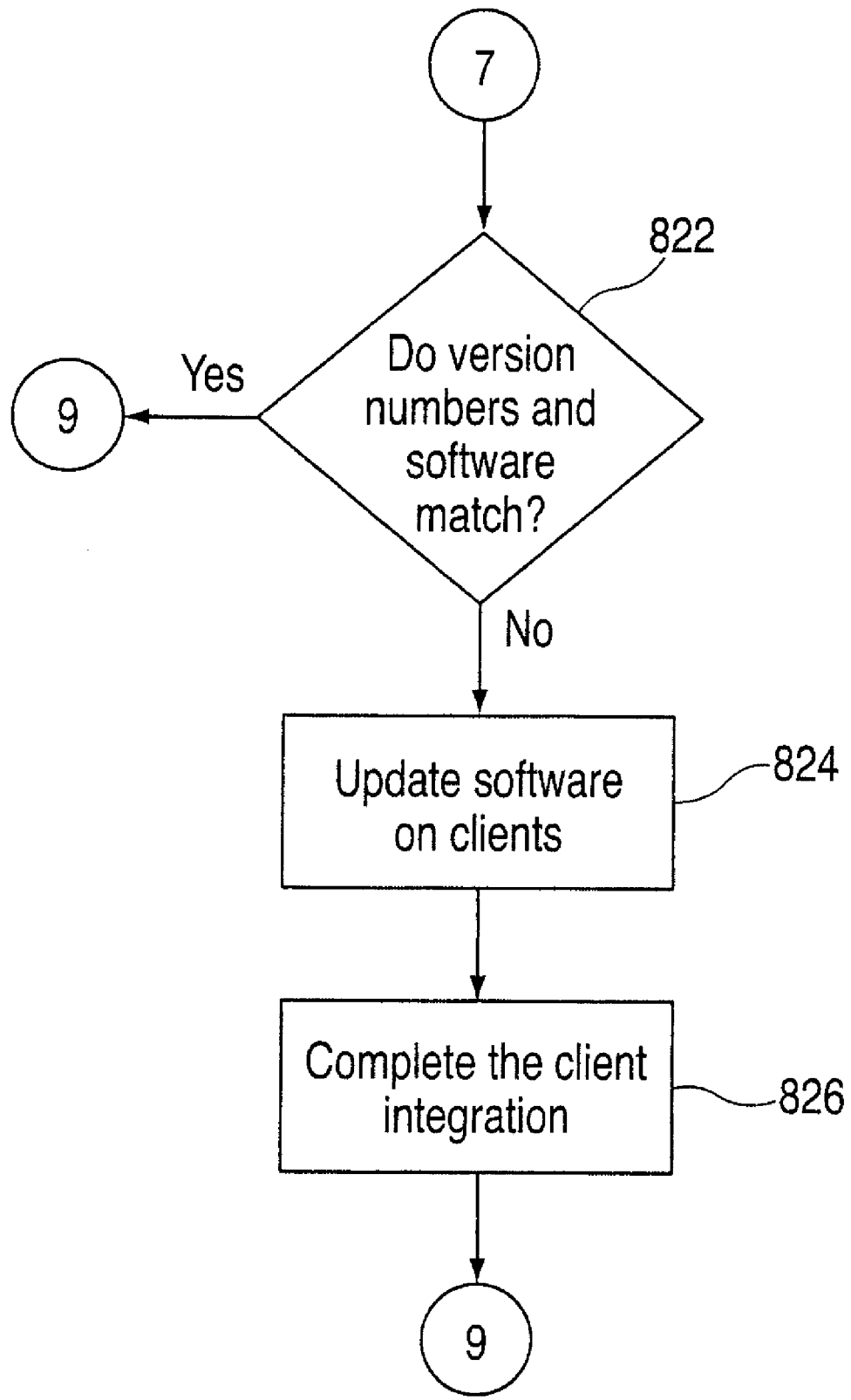

Referring to FIGS. 8A and 8B, step 800 begins the integration of the process software for implementing the deep link systems and methods of the present invention. It is determined whether there are any process software programs that will execute on a server or servers at step 802. If this is not the case, then integration proceeds to determine if the process software will execute on clients at step 814. If this is the case, then the server addresses are identified at step 804. The servers are checked to see if they contain software that includes the operating system (OS), applications, and network operating systems (NOS), together with their version numbers, that have been tested with the process software at step 806. The servers are also checked to determine if there is any missing software that is required by the process software as part of the activity at step 806. A determination is made if the version numbers match the version numbers of OS, applications and NOS that have been tested with the process software at step 808. If all of the versions match and there is no missing required software the integration continues at step 814. If one or more of the version numbers do not match, then the unmatched versions are updated on the server or servers with the correct versions at step 810. Additionally if there is missing required software, then it is updated on the server or servers at step 810. The server integration is completed by installing the process software at step 812.

Step 814, which follows either step 802, 808 or 812, determines if there are any programs of the process software that will execute on the clients. If no process software programs execute on the clients, the integration proceeds to step 820 and exits. If this not the case, then the client addresses are identified at step 816.

At step 818, the clients are checked to see if they contain software that includes the operating system (OS), applications, and network operating systems (NOS) software, together with their version numbers, that have been tested with the process software. The clients are also checked at step 818 to determine if there is any missing software that is required by the process software.

At step 822, a determination is made if the version numbers match the version numbers of OS, applications and NOS that have been tested with the process software. If all of the versions match and there is no missing required software, then the integration proceeds to step 820 and exits.

If one or more of the version numbers do not match, then the unmatched versions are updated on the clients with the correct versions at step 824. In addition, if there is missing required software then it is updated on the clients as part of step 824. The client integration is completed by installing the process software on the clients at step 826. The integration proceeds to step 820 and exits.

Deployment of Deep link system Software. It should be well understood that the process software for implementing the deep link system of the present invention may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of same with reference to FIGS. 9A and 9B, where the deployment processes are illustrated, will be more easily understood.

Step 900 begins the deployment of the process software. It is determined whether there are any programs that will reside on a server or servers when the process software is executed at step 902. If the answer is "yes", then the servers that will contain the executables are identified, as indicated in step 936 in FIG. 9B. The process software for the server or servers is transferred directly to the servers' storage via FTP or some other protocol or by copying though the use of a shared file system at step 938. The process software is then installed on the servers as indicated at step 940.

Figure 9A:
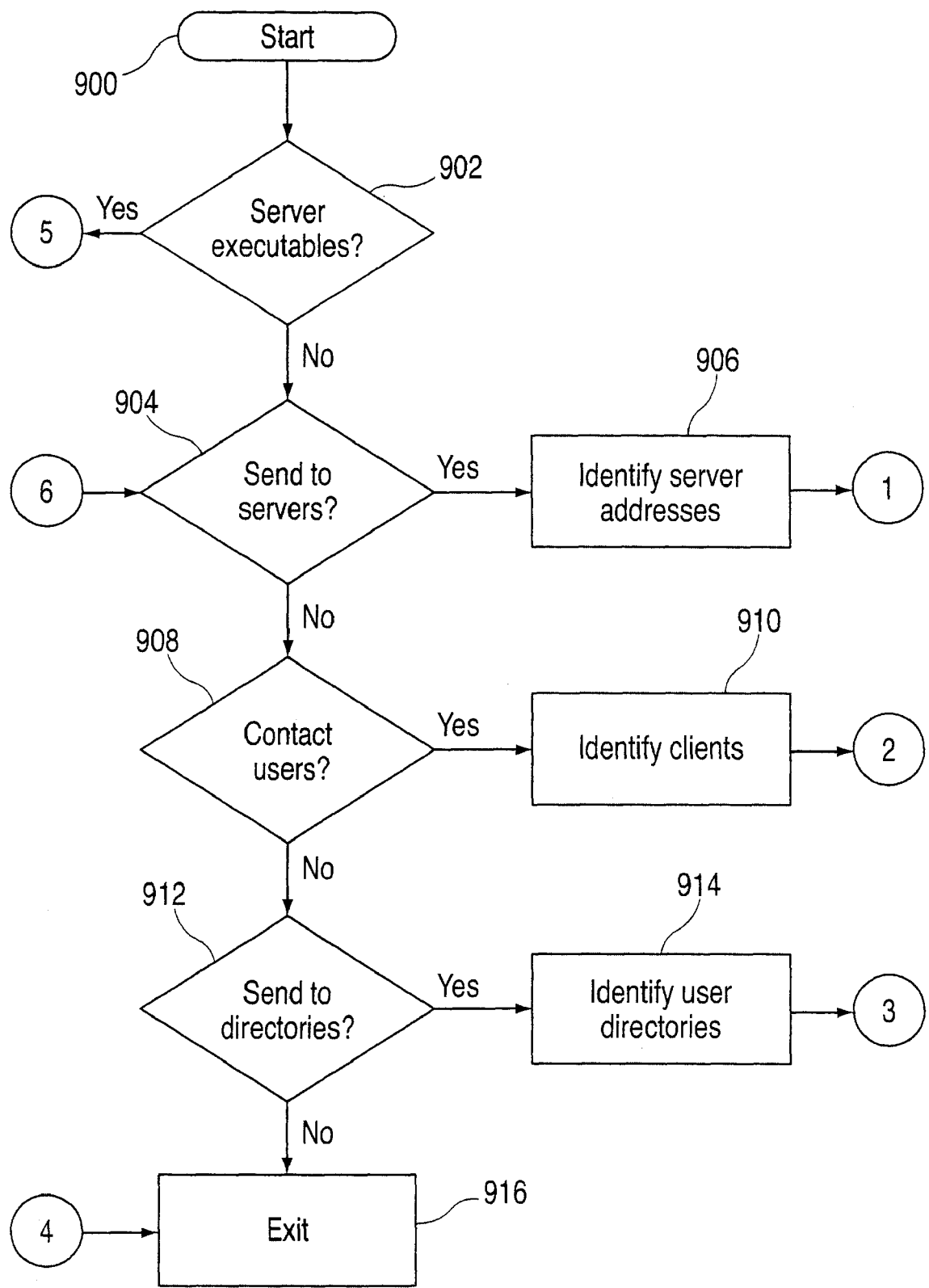
FIGS. 9A and 9B are flowcharts illustrating various ways in which process software of the invention may be semi-automatically or automatically deployed across various networks and onto server, client (user), and proxy computers.
Figure 9B:
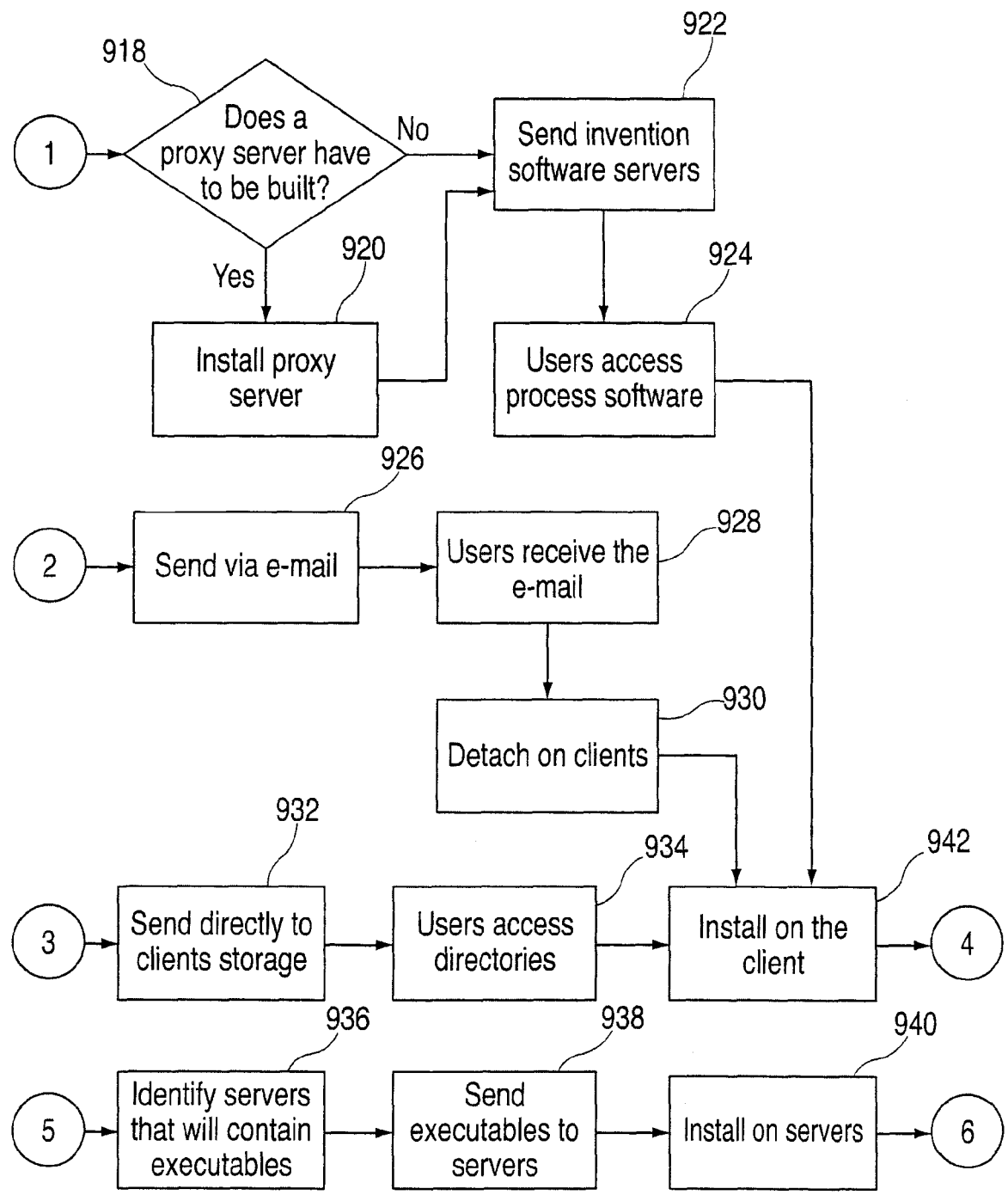

Next, as shown in step 904 in FIG. 9A, a determination is made on whether the process software is to be deployed by having users access the process software on a server or servers. If the users are to access the process software on servers, then the server addresses that will store the process software are identified at step 906.

Next, as shown at step 918, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 920. Next, the process software for implementing the present invention is sent to the servers, as indicated in step 922 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into the file systems of their client computers at step 924. Another alternative is to have the servers automatically copy the process software to each client and then run the installation program for the process software at each client computer. Either way, the user computer executes or causes to be executed the program that installs the process software on the client computer at step 942, then the process exits at step 916.

Continuing now at step 908 in FIG. 9A, a determination is made as to whether the process software is to be deployed by sending the process software to users via e-mail. If the answer is yes, then, as indicated at step 910, the set of users where the process software will be deployed are identified together with the addresses of the user client computers. The process software is sent via e-mail in step 926 (shown in FIG. 9B) to each of the users' client computers. Then, as indicated in step 928 the users then receive the e-mail, and then detach the process software from the e-mail to a directory on their client computers at step 930. The user then executes the program that installs the process software on his client computer at step 942, and then exits the process at step 916.

Continuing at step 912 (see bottom of FIG. 9A), a determination is made on whether to the process software will be sent directly to user directories on their client computers. If so, the user directories are identified at step 914. Then, the process software is transferred directly to the identified directory on user's client computer, as indicated in step 932. This can be done in several ways such as but not limited to sharing of the file system directories and then copying from the sender's file system to the recipient user's file system or alternatively using a transfer protocol such as File Transfer Protocol (FTP). Next, the users access the directories on their client file systems, as indicated in step 934, in preparation for installing the process software. Finally, the user executes the program that installs the process software on his client computer at step 942 and then exits the process at step 916.

Use of Virtual Private Networks for Deep link system Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee(s). Access to the software via a VPN can be provided as a service by specifically constructing the VPN for purposes of delivery or execution of the process software (i.e. the software resides elsewhere). In such instance, the lifetime of the VPN is often limited to a given period of time or to a given number of deployments based on an amount paid.

The process software may be deployed, accessed and executed through either a remote-access VPN or a site-to-site VPN. When using a remote-access VPN, the process software is typically deployed, accessed and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL or wireless modem to reach the NAS and use their VPN client software to access the corporate network and to access, download and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 10A-10C should be more readily understood.

Figure 10A:
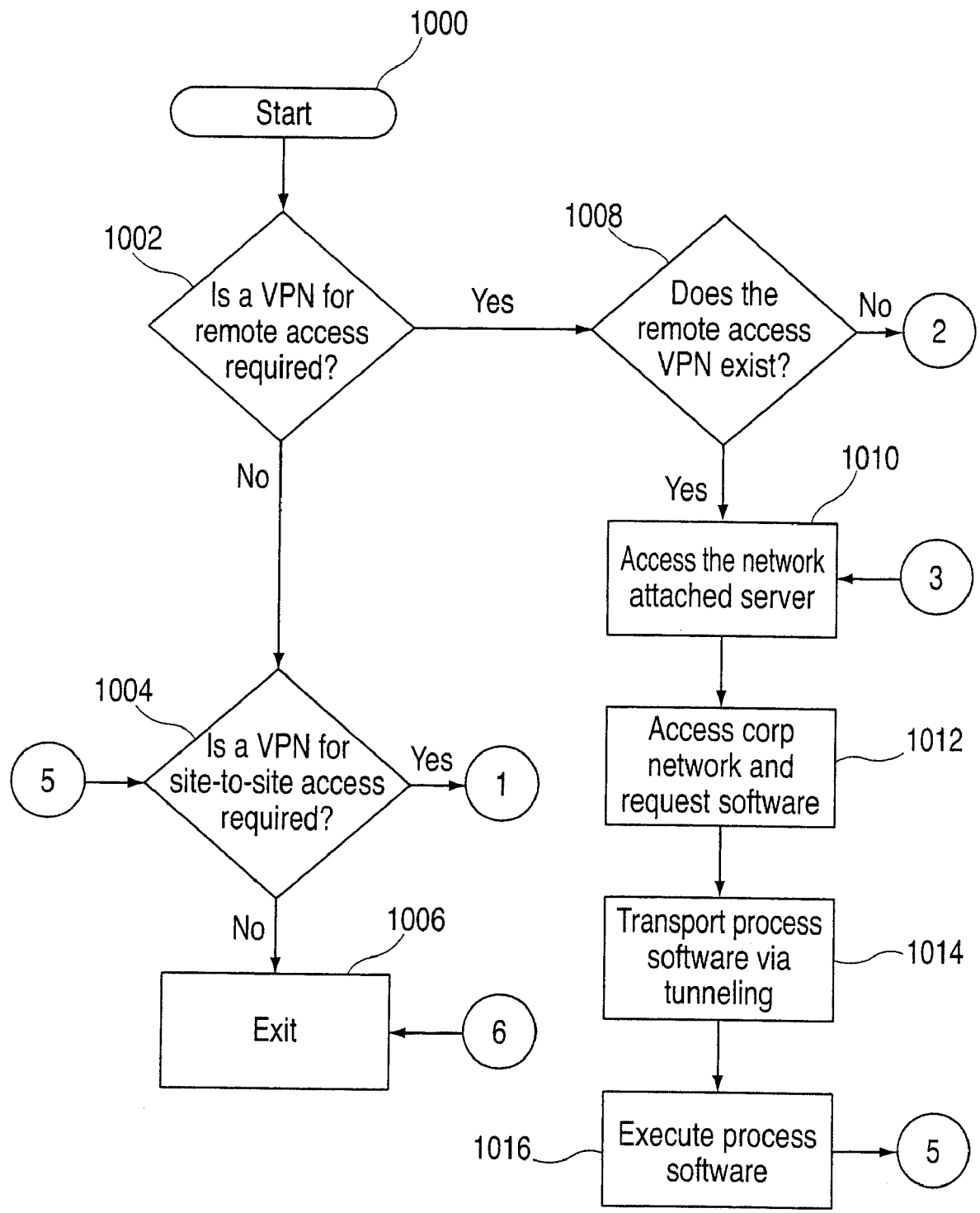
FIGS. 10A through 10C are flowcharts illustrating how process software for implementing the systems and methods of the invention are deployed through the installation and use of two different forms of a virtual private network (VPN)
Figure 10B:
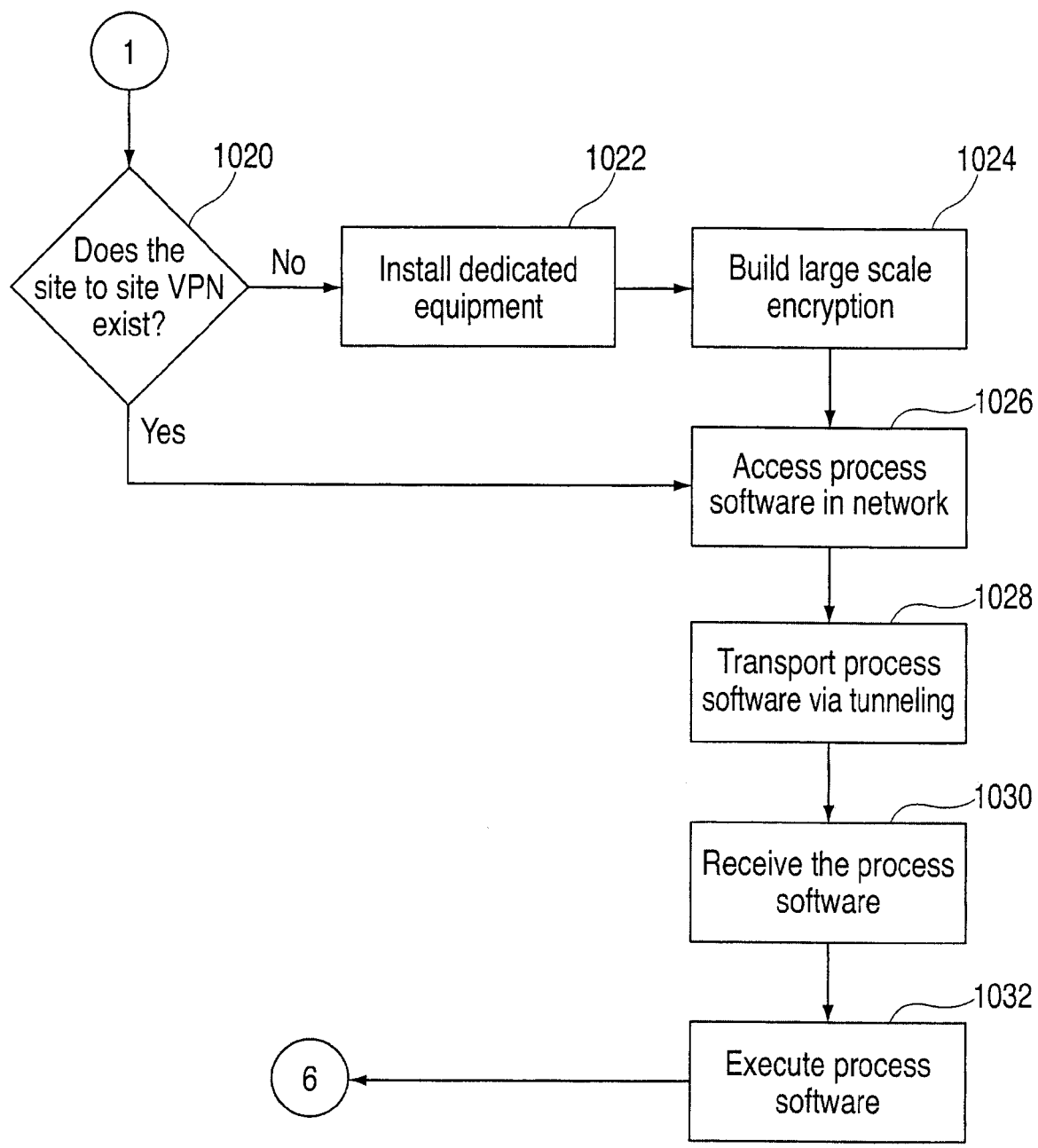
Figure 10C:
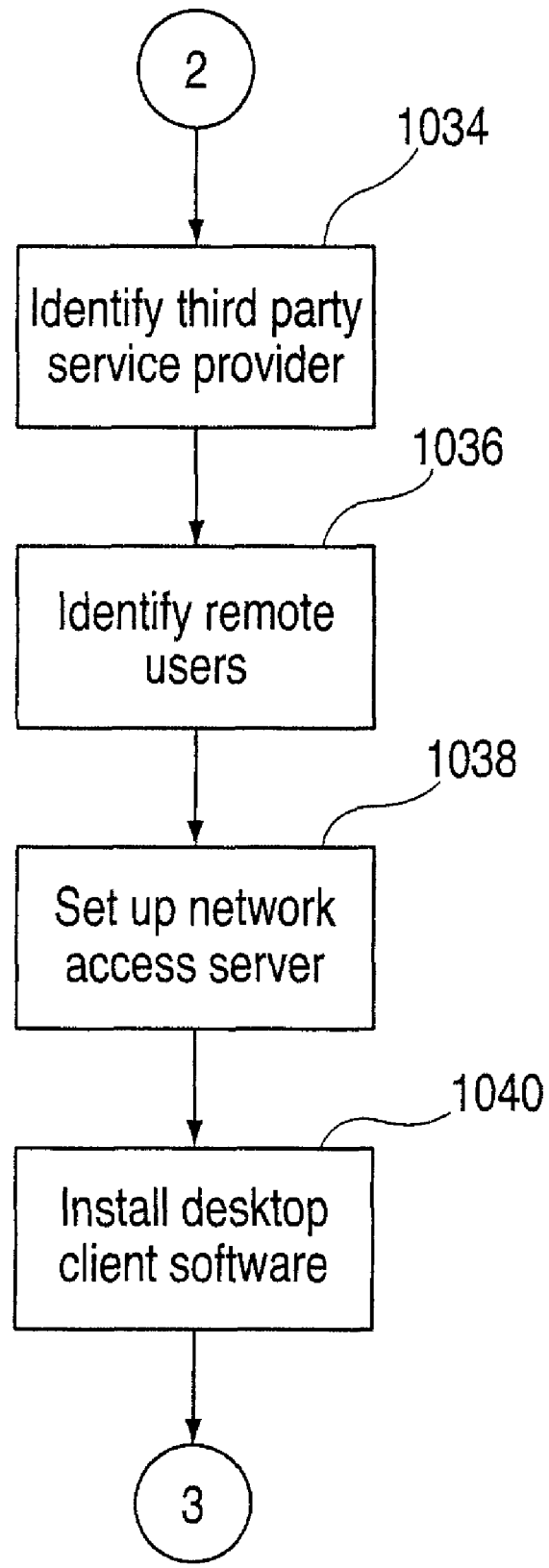
Figure 11A:
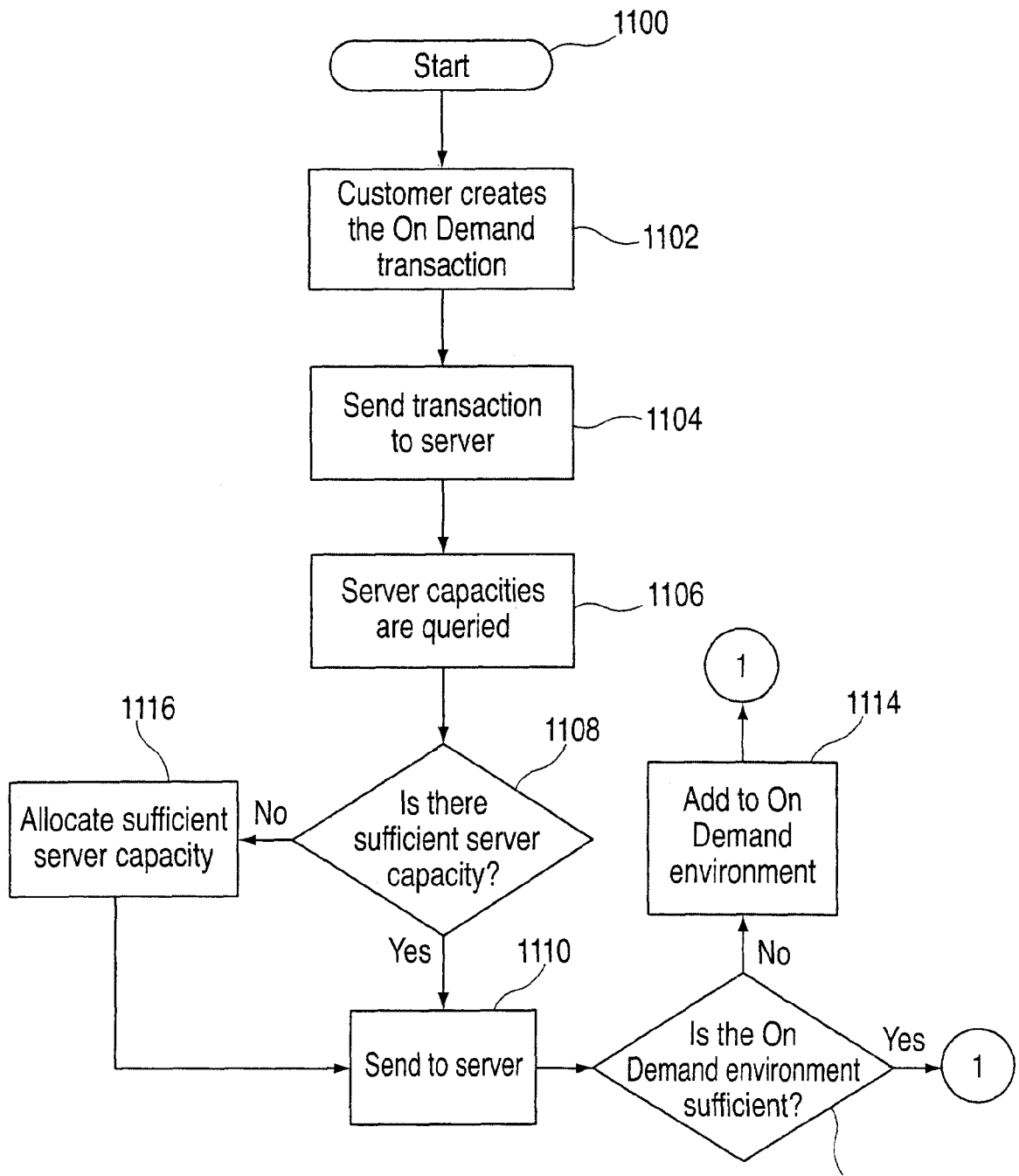
FIGS. 11A and 11B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 11B:
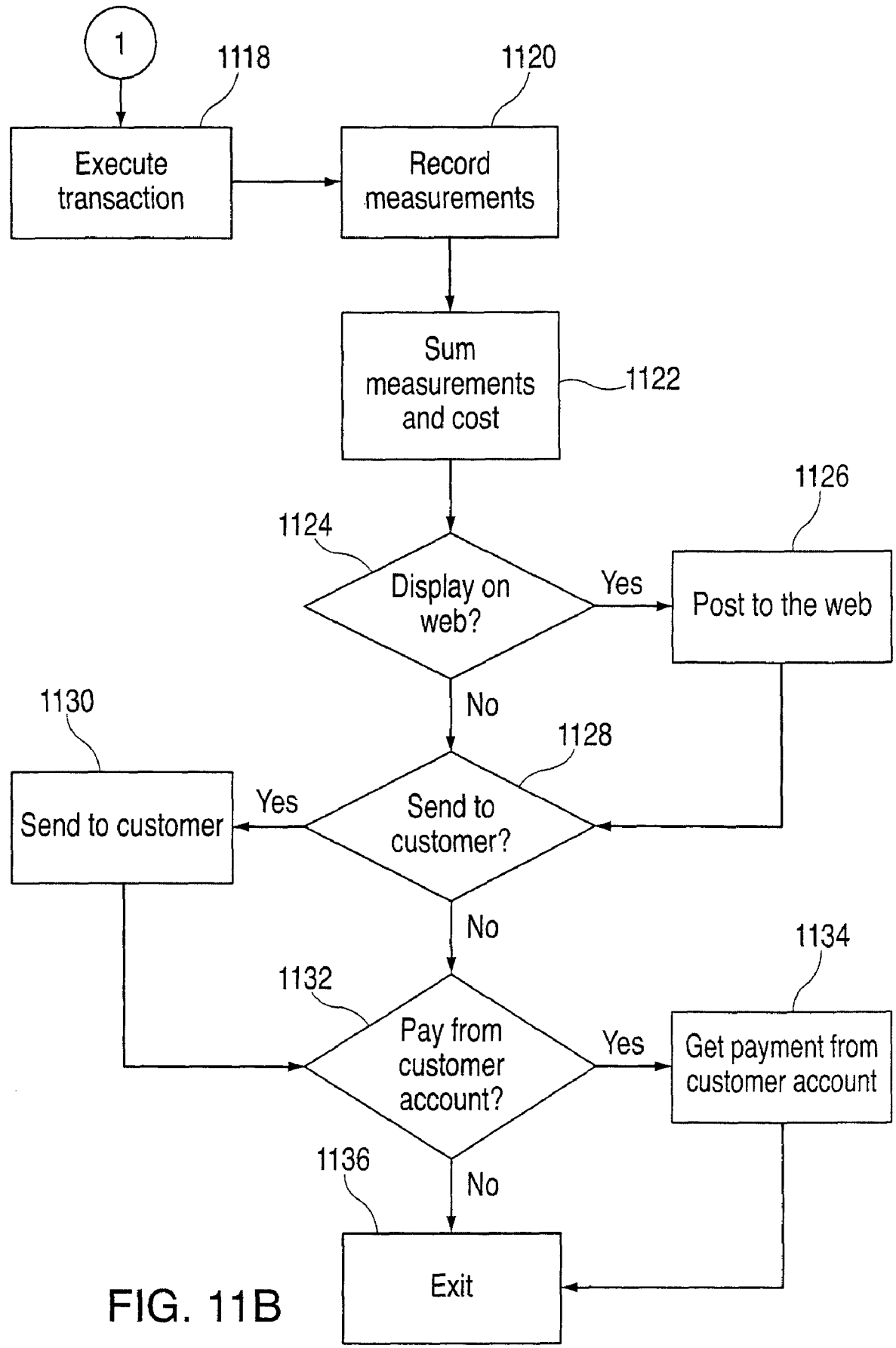

Step 1000 in FIG. 10A begins the virtual private network (VPN) process. A determination is made at step 1002 to see if a VPN for remote access is required. If it is not required, then flow proceeds to step 1004. If it is required, then flow proceeds to step 1008 where a determination is made if as to whether a remote access VPN exists that is available for use.

If a remote access VPN does exist, then flow proceeds to step 1010 in FIG. 10A. Otherwise flow proceeds to step 1034 (see top of FIG. 10C), where a third party provider that will provide the secure, encrypted connections between the company's private network and the company's remote users is identified. Next, as indicated in step 1036, the company's remote users are identified. Then, at step 1038, identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at step 1040.

Returning to step 1010 in FIG. 10A, after the remote access VPN has been built or if it been previously installed, the remote users can then access the process software by dialing into the NAS or attaching directly via a cable, DSL or other modem into the NAS. This step 1010 allows entry into the corporate network, as indicated at step 1012, where the process software may be accessed. The process software is transported to the remote user's desktop computer over the network via tunneling. During tunneling, see step 1014, the process software is divided into packets and each packet including the data and protocol for that packet, is placed within another packet. When the process software arrives at the remote user's desktop computer, it is removed from the packets, reconstituted and then may be executed on the remote users desktop, as indicated at step 1016.

Returning now to step 1004 in FIG. 10A, a determination is made to see if a VPN for site-to-site access is required. If it is not required, then flow proceeds to the exit at step 1006. If it is required, flow proceeds to step 1020 (see top of FIG. 10B) to determine if the site-to-site VPN exists. If it does exist, then flow proceeds to step 1026. If it does not exist, then as indicated at step 1022, dedicated equipment required to establish a site-to-site VPN is installed. Then build the large-scale encryption into the VPN at step 1024.

After the site-to-site VPN has been built or if it had been previously established, the users access the process software via the VPN as indicated in step 1026. Next, the process software is transported to the site users over the network via tunneling as indicated in step 1028. As previously explained, the process software is divided into packets and each packet including the data and protocol is placed within another packet, as indicated in step 1030. When the process software arrives at the remote user's desktop, it is removed from the packets, reconstituted and is executed on the site users desktop at step 1032. Then the process proceeds to step 1006 and exits.

On Demand Computing for Deep link system Software. The process software for implementing the deep link system of the present invention may be shared, that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the message analysis software will now be provided, followed by a more detailed description of same made with reference to the flowcharts of FIGS. 11A and 11B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 11A and 11B, where the on demand processes are illustrated, will be more easily understood.

Step 1100 begins the On Demand process. A transaction is created that contains the unique customer identification, the requested service type and any service parameters that further specify the type of service as indicated in step 1102. The transaction is then sent to the main server as shown in step 1104. In an On Demand environment the main server can initially be the only server, then as capacity is consumed other servers are added to the On Demand environment.

The server central processing unit (CPU) capacities in the On Demand environment are queried at step 1106. The CPU requirement of the transaction is estimated, then the servers available CPU capacity in the On Demand environment are compared to the transaction CPU requirement to see if there is sufficient CPU available capacity in any server to process the transaction as indicated in step 1108. If there is not sufficient server CPU available capacity, then additional server CPU capacity is allocated to process the transaction as indicated in step 1116. If there was already sufficient available CPU capacity, the transaction is sent to a selected server at step 1110.

Before executing the transaction, a check is made of the remaining On Demand environment to determine if the environment has sufficient available capacity for processing the transaction as indicated at step 1112. This environment capacity consists of such things as but not limited to network bandwidth, processor memory, storage, etc. If there is not sufficient available capacity, then capacity will be added to the On Demand environment as indicated in step 1114. Next the required software to process the transaction is accessed, loaded into memory, then the transaction is executed as indicated in step 1118 The usage measurements are recorded as indicated in step 1120. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer as indicated in step 1122.

If the customer has requested that the On Demand costs be posted to a web site as indicated in step 1124, then they are posted to a web site at step 1126. If the customer has requested that the On Demand costs be sent via e-mail to a customer address as indicated in step 1128, then they are sent to the customer via e-mail as indicated in step 1130. If the customer has requested that the On Demand costs be paid directly from a customer account at step 1132, then payment is received directly from the customer account at step 1134. The On Demand process proceeds to step 1136 and then exits.

As will be appreciated from the above description, the restrictions and limitations that exist with messaging systems are efficiently overcome. The deep link system of the invention enables users of email and instant messaging systems to work interoperably, allowing them to switch between messaging systems, in order to improve overall communicational efficiency.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A computer-implemented method for providing deep linking with digital rights management, comprising:
   identifying a hypertext link on a source web page on a source server as a deep link, said hypertext link referencing a target web page on a target web site of a target server, the source server in communication with the target server via a network;
   upon selecting said deep link, accessing a deep link table associated with said deep link;
   wherein said deep link table contains web page links and rules operable for establishing web content that is to be presented to a visitor of said target web site; and
   displaying web content to said visitor in accordance with said rules, the web content comprising:
   pre-display content that is displayed prior to display of said target web page; and
   with-display content that is displayed simultaneously with display of said target web page.

2. The method of claim 1, wherein said web content further comprises:
   post-display content that is displayed subsequent to display of said target web page.

3. The method of claim 2, wherein said web content further comprises at least one of:
   a web page; and
   a web page element.

4. The method of claim 2, wherein said web content further includes at least one of:
   advertising material;
   disclaimer information;
   licensing terms and conditions;
   copyright information; and
   customer surveys.

5. The method of claim 1, wherein said deep link table is created via said source web site.

6. The method of claim 1, wherein said deep link table is created via said target web site.

7. The method of claim 1, wherein said rules include runtime decisions operable for specifying digital rights management events established by said target web site that are effectuated in response to at least one of:
   visitor activities conducted at said target web site; and
   visitor identity.

8. The method of claim 1, further comprising scrolling through a deep link path of hypertext links provided in said deep link table in accordance with said rules stored in said deep link table.

9. The method of claim 1, further comprising deploying process software for providing deep linking with digital rights management, said deploying comprising:
   installing said process software on at least one server;
   identifying server addresses for users accessing said process software on said at least one server;
   installing a proxy server if needed;
   sending said process software to said at least one server and copying said process software to a file system of said at least one server;
   sending the process software to at least a first computer client; and
   executing said process software on said first computer client.

10. The method of claim 9, wherein said installing said process software further comprises:
    determining if programs will reside on said at least one server when said process software is executed;
    identifying said at least one server that will execute said process software; and
    transferring said process software to storage for said at least one server.

11. The method of claim 9, wherein said sending said process software to said first computer client further includes having said at least one server automatically copy said process software to said first computer client, and running an installation program at said first computer client to install said process software on said first computer client.

12. The method of claim 9, wherein said sending said process software to said first computer client further comprises identifying a user and an address of said first computer client.

13. The method of claim 9, wherein said sending said process software to said first computer client includes sending said process software to at least one directory on said first computer client.

14. The method of claim 9, wherein said sending said process software to said first computer client includes sending said process software to said first computer client via e-mail.

15. The method of claim 1, further comprising integrating process software for providing deep linking with digital rights management, said integrating comprising:
- determining if said process software will execute on at least one server;
- identifying an address of said at least one server;
- checking said at least one server for operating systems, applications, and version numbers for validation with said process software, and identifying any missing software applications for said at least one server that are required for integration;
- updating said at least one server with respect to any operating system and application that is not validated for said process software, and providing any of said missing software applications for said at least one server required for said integration;
- identifying client addresses and checking computer clients for operating systems, applications, and version numbers for validation with said process software, and identifying any software applications missing from said computer clients that are required for integration;
- updating said computer clients with respect to any operating system and application that is not validated for said process software, and providing any missing software application for said computer clients required for said integration; and
- installing said process software on said computer clients and said at least one server.

16. The method of claim 1, further comprising on demand sharing of process software for providing deep linking with digital rights management, said on demand sharing comprising:
- creating a transaction containing unique customer identification, requested service type, and service parameters;
- sending said transaction to at least one main server;
- querying said at least one main server about processing capacity associated with said at least one main server to help ensure availability of adequate resources for processing of said transaction; and
- allocating additional processing capacity when additional capacity appears needed to process said transaction, said additional processing capacity being selected from the group of additional capacities consisting of central processing unit capacity, processor memory capacity, network bandwidth capacity, and storage capacity.

17. The method of claim 16, further comprising recording a plurality of usage measurements selected from the group of usage measurements consisting of network bandwidth, processor memory, storage, and central processing unit cycles.

18. The method of claim 17, further comprising:
- summing said usage measurements;
- acquiring at least one multiplicative value associated with said usage measurements and with unit costs; and
- recording any such acquired multiplicative value as an on demand charge to a requesting customer.

19. The method of claim 18, further comprising at least one of:
- posting said on demand charge on a web site if requested by said requesting customer; and
- sending said on demand charge via e-mail to said requesting customer's e-mail address.

20. The method of claim 18, further comprising charging said on demand charge to said requesting customer's account if an account exists and if said requesting customer has selected a charge account payment method.

21. The method of claim 1, further comprising deploying, accessing, and executing process software for providing deep linking with digital rights management, said deploying, accessing, and executing process software implemented through a virtual private network, the method further comprising:
- determining if a virtual private network is required;
- checking for remote access to said virtual private network when it is required;
- if said remote access does not exist, identifying a third party provider to provide secure, encrypted connections between a private network and remote users;
- identifying said remote users; and
- setting up a network access server operable for downloading and installing client software on desktop computers for remote access of said virtual private network;
- accessing said process software;
- transporting said process software to at least one remote user's desktop computer; and
- executing said process software on said at least one remote user's desktop computer.

22. The method of claim 21, further comprising:
- determining if said virtual private network has a site-to-site configuration for providing site-to-site access, and if said virtual private network is not so available, installing equipment required to establish a site-to-site configuration for said virtual private network;
- installing large scale encryption into said site-to-site virtual private network; and
- accessing said process software through said site-to-site configuration with large scale encryption.

23. The method of claim 22, wherein said accessing said process software further comprises at least one of:
- dialing into said network access server, and
- attaching directly via a modem into said network access server, said modem being selected from the group of modems consisting of telephone dial-up modems, cable modems, DSL modems, and wireless modems.

24. A nontransitory storage medium including machine-readable computer program code for providing deep linking with digital rights management, comprising:
- identifying a hypertext link on a source web page on a source server as a deep link, said hypertext link referencing a target web page on a target web site of a target server, the source server in communication with the target server via a network;
- upon selecting said deep link, accessing a deep link table associated with said deep link;
- wherein said deep link table contains web page links and rules operable for establishing web content that is to be presented to a visitor of said target web site; and
- displaying web content to said visitor in accordance with said rules, the web content comprising:
  - pre-display content that is displayed prior to display of said target web page; and
  - with-display content that is displayed simultaneously with display of said target web page.

25. The storage medium of claim 24, wherein said web content further comprises:
- post-display content that is displayed subsequent to display of said target web page.

26. The storage medium of claim 25, wherein said web content further comprises at least one of:
- a web page; and
- a web page element.

27. The storage medium of claim 25, wherein said web content further includes at least one of:
- advertising material;
- disclaimer information;
- licensing terms and conditions;
- copyright information; and
- customer surveys.

28. The storage medium of claim 24, wherein said deep link table is created via said source web site.

29. The storage medium of claim 24, wherein said deep link table is created via said target web site.

30. The storage medium of claim 24, wherein said rules include run-time decisions operable for specifying digital rights management events established by said target web site that are effectuated in response to at least one of:
- visitor activities conducted at said target web site; and
- visitor identity.

31. The storage medium of claim 24, further comprising a means for facilitating web page scrolling through a deep link path of hypertext links provided in said deep link table in accordance with said rules stored in said deep link table.

32. The storage medium of claim 24, further comprising instructions for causing said computer to deploy process software for providing deep linking with digital rights management, wherein deployment of process software comprises:
- installing said process software on at least one server;
- identifying server addresses for users accessing said process software on said at least one server;
- installing a proxy server if needed;
- sending said process software to said at least one server and copying said process software to a file system associated with said at least one server;
- sending said process software to at least a first client system;
- executing said process software on said first client system;
- determining if programs will reside on said at least one server when said process software is executed;
- identifying said at least one server that will execute said process software; and
- transferring said process software to storage for said at least one server.

33. The storage medium of claim 32, wherein said installing said process software further comprises:
- determining if programs will reside on said at least one server when said process software is executed;
- identifying said at least one server that will execute said process software; and
- transferring said process software to storage for said at least one server.

34. The storage medium of claim 32, wherein said sending said process software to said first client system includes having said at least one server automatically copy said process software to said first client system, and running an installation program at said first client system to install said process software on said first client system.

35. The storage medium of claim 32, wherein said sending said process software to said first computer client further comprises identifying a user and an address of said first computer client.

36. The storage medium of claim 32, wherein said sending said process software to said first computer client includes sending said process software to at least one directory on said first computer client.

37. The storage medium of claim 32, wherein said sending said process software to said first computer client includes sending said process software to said first computer client via e-mail.

38. The storage medium of claim 24, further comprising instructions for causing said computer to integrate process software for providing deep linking with digital rights management activities, wherein integration comprises:
- determining if said process software will execute on at least one server;
- identifying an address of said at least one server;
- checking said at least one server for operating systems, applications, and version numbers for validation with said process software, and identifying any missing software applications for said at least one server that are required for integration;
- updating said at least one server with respect to any operating system and application that is not validated for said process software and providing any of said missing software application for said at least one server required for said integration;
- identifying client addresses and checking client systems for operating systems, applications, and version numbers for validation with said process software, and identifying any software applications missing from said client systems that are required for integration;
- updating said client systems with respect to any operating system and application that is not validated for said process software, and providing any missing software application for said client systems required for said integration; and
- installing said process software on said client systems and said at least one server.

39. The storage medium of claim 24, further comprising instructions for causing said computer to implement on demand sharing of process software operable for providing deep linking with digital rights management, said on demand sharing of process software including:
- creating a transaction containing a unique customer identification, requested service type, and service parameters;
- sending said transaction to said at least one server;
- querying said at least one server about processing capacity associated with said at least one server to help ensure availability of adequate resources for processing of said transaction; and
- allocating additional processing capacity when additional capacity is needed to process said transaction, said additional processing capacity being selected from the group of additional capacities consisting of central processing unit capacity, processor memory capacity, network bandwidth capacity, and storage capacity.

40. The storage medium of claim 39, further comprising instructions for causing said computer to implement:
- recording a plurality of usage measurements selected from the group of usage measurements consisting of network bandwidth, processor memory, storage, and central processing unit cycles.

41. The storage medium of claim 40, further comprising instructions for causing said computer to implement:
- summing said usage measurements;
- acquiring at least one multiplicative value associated with said usage measurements and with unit costs; and
- recording any such acquired multiplicative value as an on demand charge to a requesting customer.

42. The storage medium of claim 41, further comprising instructions for causing said computer to implement at least one of:
- posting said on demand charge on a web site if requested by said requesting customer; and sending said on demand charge via e-mail to said requesting customer's e-mail address.

43. The storage medium of claim 41, further comprising instructions for causing said computer to implement:

charging said on demand charge to said requesting customer's account if an account exists and if said requesting customer has selected a charge account payment method.

44. The storage medium of claim 24, further comprising instructions for causing said computer to implement deploying, accessing, and executing process software for providing deep linking with digital rights management through a virtual private network, said deploying, accessing, and executing process software including:

determining if a virtual private network is required;

checking for remote access to said virtual private network when it is required;

if said remote access does not exist, identifying a third party provider to provide secure, encrypted connections between a private network and remote users;

identifying said remote users;

setting up a network access server for downloading and installing client software on desktop computers for remotely accessing said virtual private network;

accessing said process software;

transporting said process software to at least one remote user's desktop computer; and executing said process software on said at least one remote user's desktop computer.

45. The storage medium of claim 44, further comprising instructions for causing said computer to implement:

determining if said virtual private network has a site-to-site configuration for providing site-to-site access, and if said virtual private network is not so available, installing equipment required to establish a site-to-site configuration for said virtual private network;

installing large scale encryption into said site-to-site virtual private network; and accessing said process software through said site-to-site configuration with large-scale encryption;

wherein said accessing said process software includes at least one of:

dialing into said network access server; and attaching directly via a modem into said network access server, said modem being selected from the group of modems consisting of telephone dial-up modems, cable modems, DSL modems and wireless modems.

46. A system for providing deep linking with digital rights management, comprising:

a web-enabled computer system, a source server including a source web page, and a target server in communication with each other via a network;

a deep link located within said source web page, said deep link referring to a hypertext link to a web page located on said target server that is not said target server's home page; and a deep link table accessible to said source server, said deep link table storing hypertext links for said target web site including rules operable for presenting associated web pages to visitors of said target web site in a manner consistent with said target web site's intent, including pre-display content to display prior to displaying a target web page and with-display content to display simultaneously with display of said target web page;

wherein when a user of said web-enabled computer system accesses said deep link, said web pages associated with said target web site are presented in a sequence prescribed by said deep link table.

47. The system of claim 46, wherein said web pages include at least one of:

advertising;

disclaimer notices;

copyright information;

licensing terms and conditions; and surveys.

48. The system of claim 46, further comprising a means for scrolling through a deep link path of hypertext links provided in said deep link table in accordance with said rules stored in said deep link table.

* * * * *